United States Patent
Matsunaga (10) Patent No.: US 9,286,928 B1
(45) Date of Patent: Mar. 15, 2016

(54) MEASURING METHOD, MANUFACTURING METHOD FOR MAGNETIC DISK DEVICE, AND MAGNETIC DISK DEVICE

(71) Applicant: Kabushiki Kaisha Toshiba, Minato-Ku, Tokyo (JP)

(72) Inventor: Toshitaka Matsunaga, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/754,187

(22) Filed: Jun. 29, 2015

Related U.S. Application Data (60) Provisional application No. 62/131,145, filed on Mar. 10, 2015.

(51) Int. Cl.
G11B 21/02 (2006.01)
G11B 5/60 (2006.01)

(52) U.S. Cl.
CPC ................... G11B 5/6005 (2013.01)

(58) Field of Classification Search
CPC .......... G11B 5/004; G11B 5/48; G11B 27/36; G11B 5/012; G11B 2220/20; G11B 5/00; G11B 5/02; G11B 5/6005; G11B 5/59633; G11B 5/54; G11B 25/043

USPC ........ 360/75, 31, 55, 59, 77.06, 97.12, 234.3, 360/67, 290, 313
See application file for complete search history.

(56) References Cited

U.S. PATENT DOCUMENTS

| | | | |
|---|---|---|---|
| 7,864,475 B2 * | 1/2011 | Nakamura | G11B 5/02 360/31 |
| 2008/0310045 A1 | 12/2008 | Urata | |
| 2009/0213486 A1 | 8/2009 | Takahashi | |
| 2009/0225461 A1 | 9/2009 | Aoki | |

FOREIGN PATENT DOCUMENTS

JP 2011-113573 A 6/2011

* cited by examiner

*Primary Examiner* — Nabil Hindi
(74) *Attorney, Agent, or Firm* — White & Case LLP (57) ABSTRACT

According to one embodiment, a measurement method is applied to a disk device including a disk, and a head configured to protrude toward the disk when power is supplied thereto. In the method, a reference value for each of areas of the disk is acquired from a measurement-value distribution including pre-measured values that correspond to power supplied to a heater when the head is brought into contact with the disk. In each area, a data group calculated from the distribution and the reference value is acquired. An area where the data group has lower values than in the other areas is selected as a first area to be firstly measured. An area to be measured subsequent to the first area based on the data group is selected.

20 Claims, 8 Drawing Sheets

| Measurement area | Zone 1 | Zone 2 | Zone 3 | Zone 4 | Zone 5 | Zone 6 | Zone 7 | Zone 8 | Zone 9 | Zone 10 |
|---|---|---|---|---|---|---|---|---|---|---|
| パターン1 | 10 | 9 | 8 | 7 | 1 | 2 | 3 | 4 | 5 | 6 |
| パターン2 | 5 | 4 | 3 | 2 | 1 | 6 | 7 | 8 | 9 | 10 |
| パターン3 | 9 | 7 | 5 | 3 | 1 | 2 | 4 | 6 | 8 | 10 |
| ... | ... | ... | ... | ... | ... | ... | ... | ... | ... | ... |

MEASURING METHOD, MANUFACTURING METHOD FOR MAGNETIC DISK DEVICE, AND MAGNETIC DISK DEVICE

CROSS-REFERENCE TO RELATED APPLICATIONS

This application claims the benefit of U.S. Provisional Application No. 62/131,145, filed Mar. 10, 2015, the entire contents of which are incorporated herein by reference.

FIELD

Embodiments described herein relate generally to a measuring method, a manufacturing method for a magnetic disk device, and a magnetic disk device.

BACKGROUND

In control of a hard disc drive (HDD), a touchdown measurement is known as one process for controlling a gap (the flying height of a head) between a head and a disk. The touchdown measurement is a method of applying power to the heating element (heater) of a head to thermally expand part of the head so as to protrude it to a disk and to contact it with the disk, thereby measuring applied power (i.e., a control value for the flying height) when the contact with the disk has been detected.

In general, in the touchdown measurement, a most likelihood value is calculated as a real value, based on measured values acquired by a plurality of trials. If power exceeding the real value is applied, the head may contact the disk, which may well be a cause of a head failure or reduction of reliability of the device.

Different head flying heights are detected among different heads and/or among positions on the writing surface of each disk. Therefore, in an HOD manufacturing process, touchdown measurement may be executed for each head or each disk writing surface. In this case, it is necessary to divide the disk into a plurality of radial measurement areas, and to execute touchdown measurement in each measurement area to thereby measure a flying height flying profile) therein.

DETAILED DESCRIPTION

In accordance with one embodiment, there is provided a measurement method for use in a disk device comprising a disk, and a head configured to protrude toward the disk when power is supplied to a heater, the method comprising: acquiring a reference value for each of a plurality of areas into which the disk is divided, from a measurement-value distribution including a plurality of measured values measured by a measurement in advance, the measurement including measuring a value corresponding to power supplied to the heater when the head contact with the disk; acquiring, in each of the plurality of areas, a groups of data calculated based on the measurement-value distribution and the acquired reference value; referring to the groups of data corresponding to each of the plurality of areas, and selecting, from the plurality of areas as a first area to be firstly subjected to the measurement, an area where the groups of data has lower values than in other areas; and selecting an area to be subjected to the measurement subsequent to the first area based on the groups of data in each areas.

First Embodiment

An embodiment is directed to a touchdown measuring method as a technical example for evaluating the flying height of a magnetic head (head) in dynamic flying height (DFH) control.

In the DFH control, the distance (flying height) between a head and a disk is controlled by changing power applied to a heating element (heater) incorporated in the head to change thermal expansion of part of the head. Moreover, touchdown measurement is a method of measuring power (control value [digital/analog converter value: DAC value]) applied to the heater when the head is contacted the disk, in order to control a flying height in the DFH control. Details of this method will be described later. A method of bringing the head into contact with the disk (touchdown) and setting, as a reference power, the applied power when the touchdown is detected, is included in touchdown measurement methods. In this method, the applied power when the touchdown of the head and the disk is detected is the maximum power in the DFH control. Namely, touchdown can be detected by detecting the maximum power. When the touchdown is detected, it can be estimated that the head contact with the disk, and hence the flying height is determined to be minimum.

In the embodiment, a measured-value distribution (flying profile) is a distribution of maximum power values acquired by touchdown measurement in respective measurement positions on the disk. Hereinafter, measured values will be referred to as measured values associated with maximum power values applied to the heater in the touchdown measurement.

Touchdown measurement is performed in a test process included in manufacture of a magnetic disk device, or in the magnetic disk device itself as a product.

A description will now be given of a magnetic disk device 1 as an example of a device to which the touchdown measurement method of the embodiment is applied.

Figure 1:
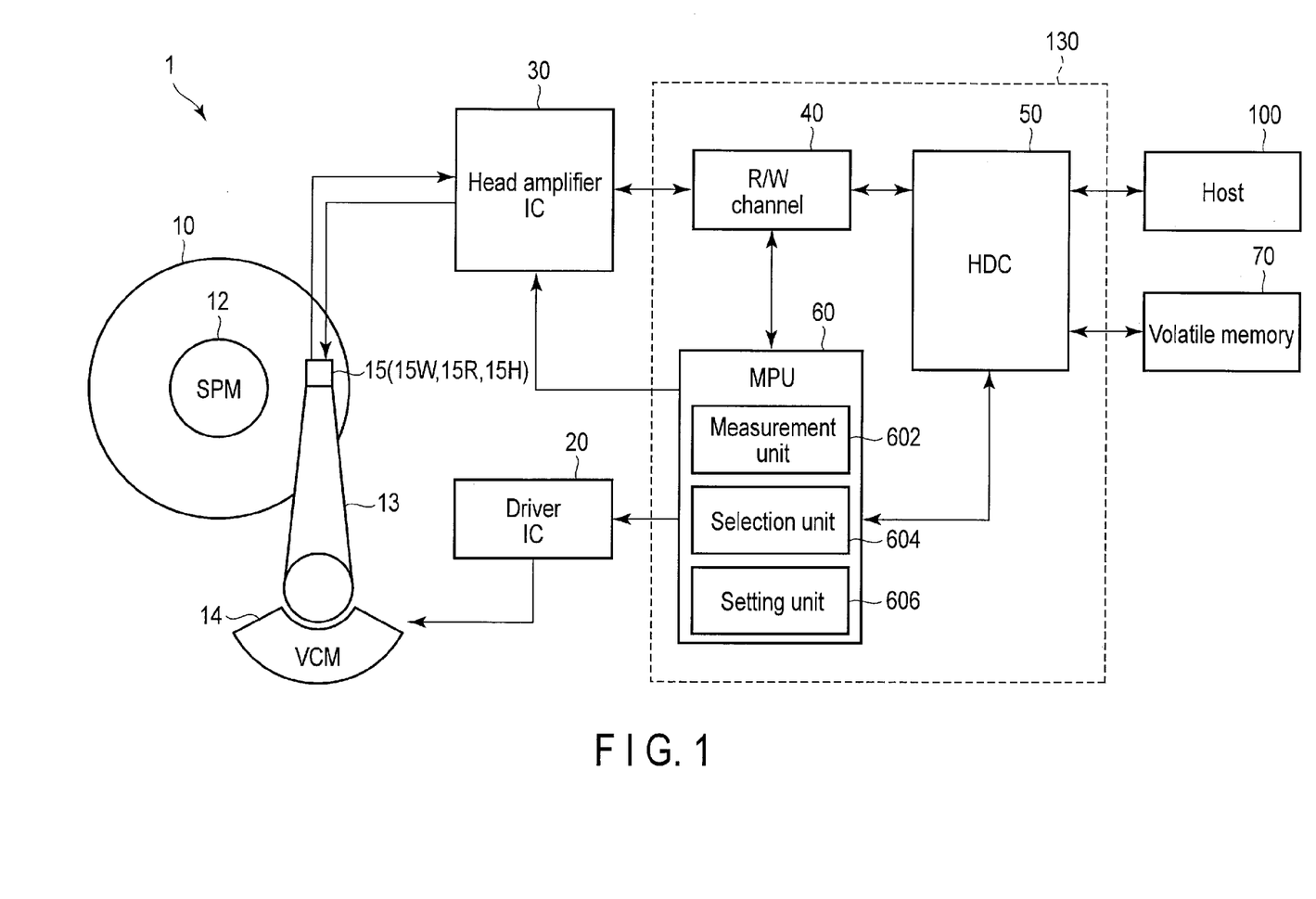
FIG. 1 is a schematic block diagram showing configuration of a magnetic disk device according to an embodiment.
Figure 2A:
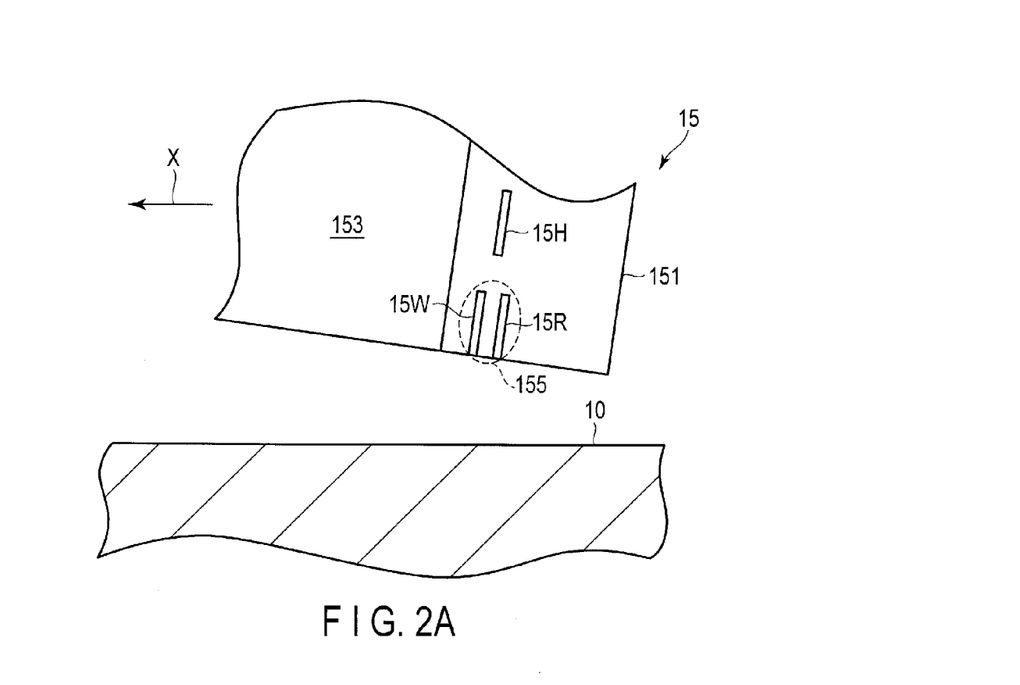
FIG. 2A is a schematic view showing a state of a head before expansion in the embodiment.
Figure 2B:
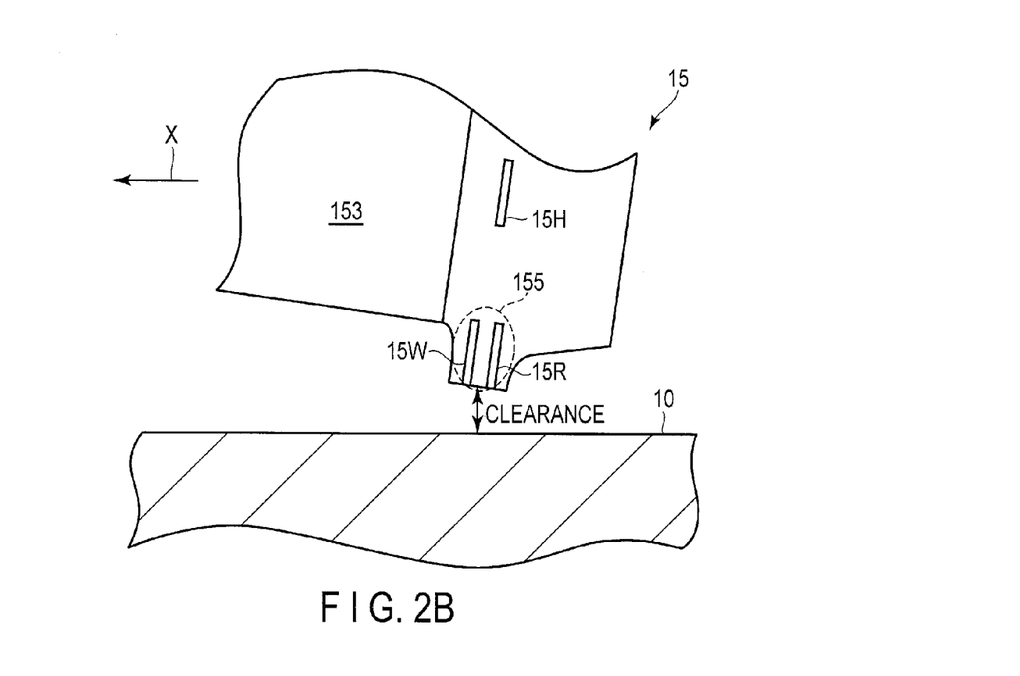
FIG. 2B is a schematic view showing a state of the head after expansion in the embodiment.

FIG. 1 is a block diagram showing configuration of the magnetic disk device 1 according to the embodiment. FIGS. 2A and 2B are schematic views showing a head 15 and a disk 10 according to the embodiment. FIG. 2A schematically shows a state of the head 15 before expansion, while FIG. 23 schematically shows a state of the head 15 after expansion.

The magnetic disk device 1 includes a head-disk assembly (HDA), described later, a driver IC 20, a head amplifier integrated circuit (hereinafter, referred to as the head amplifier IC) 30, a volatile memory 70, and a system controller 130 formed of a one-chip integrated circuit. The magnetic disk device 1 is connected to a host system (host) 100.

The HDA includes a magnetic disk (hereinafter, referred to as the disk) 10, a spindle motor (SPM) 12, an arm 13 with the head 15 mounted thereon, and a voice coil motor (VCM) 14. The disk 10 is rotated by the spindle motor 12. The arm 13 and VCM 14 constitute an actuator. The actuator is driven by the VCM 14 to move the head 15 mounted on the arm 13 to a particular position on the disk 10. Actually, one or more disks 10 and one or more heads 15 are provided.

The head 15 is provided with a thin-film head part 151 and a slider 153.

The thin-film head part (hereinafter, referred to as the head part) 151 includes read head 15R, write head 15W and heater element (heater) 15H. Read head 15R reads data currently recorded on the disk 10. Write head 15W writes data to the disk 10. Hereinafter, read head 15R and write head 15W will be collectively referred to as a write/read element. Heater 15H generates heat when it is supplied with power. Heater 15H may include two separate heater elements provided near write head 15W and read head 15R, respectively. In FIGS. 2A and 2B, the head 15 moves in a direction indicated by arrow X in accordance with rotation of the disk 10. When heater 15H is not heating (i.e., it is in a normal state), a portion of the head part 151 including the write/read element (hereinafter, a write/read part 155) does not protrude toward the disk 10 as shown in FIG. 2A. In contrast, when heater 15H is heating, the write/read part 155 protrudes toward the disk 10 due to thermal expansion, as is shown in FIG. 2B. Thus, when heater 15H is heating, the tip of the thermally expanded write/read part 155 becomes the lowest point of the flying head 15, as is shown in FIG. 2B.

The head part 151 may incorporate a head disk interface (HDI) sensor in the write/read part 155. The HDI sensor includes a resistance element, and is used to detect minute heat. When the head part 151 is brought into contact with the disk 10, the HDI sensor has its thermal resistance varied due to friction heat, and hence the resistance element of the HDI sensor varies in resistance value.

Returning to FIG. 1, the driver IC 20 controls the SPM 12 and VCM 14.

The head amplifier IC 30 includes a read amplifier and a write amplifier (not shown). The read amplifier amplifies a read signal read by read head 15R, and transmits it to a R/W channel 40, described later. The write amplifier transmits, to write head 15W, a write current corresponding to a write signal output from the R/W channel 40.

The head amplifier IC 30 functions as an adjustment circuit for supplying power to heater 15H to adjust a power quantity thereof.

When the HDI sensor is incorporated in the head part 151, the head amplifier IC 30 can detect a change in the resistance of the resistance element of the HDI sensor.

The volatile memory 70 is a semiconductor memory wherein stored data is lost when power supply is interrupted. The volatile memory 70 stores, for example, data required for processing in each part of the magnetic disk device 1. The volatile memory 70 is, for example, a synchronous dynamic random access memory (SDRAM).

The system controller 130 includes the R/W channel 40, a hard disk controller (HDC) 50, and a microprocessor (MPU) (controller) 60.

The R/W channel 40 performs signal processing of read and write data. The R/W channel 40 decodes read data extracted from a read signal supplied from the head amplifier IC 30. The R/W channel 40 transmits the decoded read data to the HDC 50 and the MPU 60. The read data includes user data and servo data. The R/W channel 40 subjects write data, supplied from the HDC 50 and the MPU 60, to code modulation, and converts the code-modulated write data into a write signal. The R/W channel 40 transmits the write signal to the head amplifier IC 30.

The HDC 50 controls data transfer between the host 100 and the R/W channel 40, using the volatile memory 70.

The MPU 60 is a main controller which controls each part of the magnetic disk device 1. The MPU 60 controls VCM 14 via the driver IC 20, and performs servo control for positioning the head 15. The MPU 60 of the first embodiment performs measurement (touchdown measurement) of the flying height. At this time, the MPU 60 outputs an instruction signal to the head amplifier IC 30.

The MPU 60 includes a measurement unit 602, a selection unit 604, and a setting unit 606. The processing of these parts is executed on firmware.

The measurement unit 602 controls the radial position of the head 15 on the disk 10, and the flying height of the head, and executes touchdown measurement in accordance with instruction signals from the selection unit 604 and the setting unit 606 described later. In the first embodiment, the measurement unit 602 utilizes DFH control.

The measurement unit 602 outputs, to the head amplifier IC 30, a signal (DFH control signal) indicating instructed power. The measurement unit 602 controls the flying height of the head part 151 by controlling the power applied to heater 15H by the head amplifier IC 30. Namely, by increasing and decreasing the level of the DFH control signal, the measurement unit 602 moves the head part 151 toward and away from the surface of the disk 10. The DFH control signal can be indicated by a DAC value. For example, if the DFH control signal assumes a minimum value, i.e., a zero DAC value, the flying height becomes maximum.

The measurement unit 602 outputs a DFH control signal to the head amplifier IC 30, thereby making the head part 151 touch the disk 10. The measurement unit 602 determines, as reference power, power applied to heater 15H when touchdown is detected. Power supplied by head amplifier IC 30 when the touchdown has been detected is a maximum applied power.

The measurement unit 602 detects touchdown by some known methods. A an example, the measurement unit 602 can detect touchdown by monitoring a position error signal (PES) of the head 15 with respect to the radial direction of the disk 10. For example, if the level of the PES or a change in the PES exceeds a threshold, the measurement unit 602 determines that touchdown has occurred. Alternatively, the measurement unit 602 can detect touchdown by referring to the amplitude of a read signal, the value of servo VGA or data VGA, or a control signal from the VCM 14.

Further, if the HDI sensor is installed in the head part 151, the measurement unit 602 can detect touchdown by monitoring a change in the output (resistance) from the HDI sensor via the head amplifier IC 30.

Furthermore, if in a test process in the manufacture of an HDD, an acoustic emission (AE) sensor can be used, vibration of the head due to touchdown can be detected using the AE sensor. For example, the measurement unit 602 can detect vibration of the head 15 using the AE sensor installed in the actuator, and can detect touchdown based on the detected vibration.

The measurement unit 602 executes a number of touchdown measurement trials, thereby acquiring a number of measured values for each of areas (measurement areas) into which the disk 10 is divided. The measurement unit 602 acquires a true value for each measurement area from the number of acquired measured values. For instance, the measurement unit 602 extracts respective medians (i.e., a median distribution) from the numbers of measured values in the measuring areas on the display 10, and sets, as respective true values, the extracted medians corresponding to the measuring areas.

Measured values greater than each true value will be referred to as DFH excessive protrusion quantities (hereinafter, referred to as excessive protrusion quantities).

If it detects a measured value greater than a specified value (for example, a true value), the measurement unit 602 determines this measured value to be an excessive protrusion quantity. The measurement unit 602 determines excessive protrusion quantities, based on measured values (i.e., a measured-value distribution) acquired by the touchdown measurement in advance and corresponding to each measurement area, and a corresponding particular value (for example, a corresponding true value), thereby generating data indicating an excessive protrusion distribution (excessive value distribution [a group of data]) corresponding to each measurement area.

The measurement unit 602 can also compute the number of occurrences of excessive protrusion quantity and the rate of occurrence of the same, from the data indicating the excessive protrusion distribution. The measurement unit 602 can acquire, from, for example, a memory (e.g., the volatile memory 70), data indicating setting of measurement areas on the disk 10 or values measured by the touchdown measurement in advance for each measurement area.

The selection unit 604 extracts, from the generated data indicating an excessive protrusion distribution, measurement areas where excessive protrusion quantities are small, and selects the order of execution of touchdown measurements (hereinafter, referred to as the measurement order). The phenomenon in which excessive protrusion quantities are small is caused by a fact that measured values obtained by the touchdown measurement exhibit small variations.

Firstly, the selection unit 604 determines an excessive protrusion quantity in each measurement area, based on data indicating a distribution of excessive protrusion quantities measured by the touchdown measurement in advance.

Subsequently, based on the result of determination of the excessive protrusion quantity in each measurement area, the selection unit 604 selects, as a measurement area to be firstly subjected to touchdown measurement, a measurement area where the excessive protrusion quantity is smaller than in the other measurement areas. Further, based on the result of determination associated with the excessive protrusion quantity in each measurement area, the selection unit 604 executes, on each measurement area, processing of sequentially selecting measurement areas to be subjected to touchdown measurement Subsequently, the selection unit 604 sets a measurement order corresponding to the selection order. The selection unit 604 may record the set measurement order as a table in a memory, such as the volatile memory 70.

The selection unit 604 outputs data indicating the measurement order to the measurement unit 602 and the setting unit 606.

Referring then to associated figures, a description will be given of an example of a measurement-order selection method based on an excessive protrusion distribution detected at the time of touchdown measurement.

Firstly, an example of a method of determining an excessive protrusion quantity in each measurement area will be described.

FIGS. 3A, 3B, 3C and 3D show examples of excessive protrusion distributions obtained by touchdown measurement experiments of a certain design lot.

In the examples of FIGS. 3A to 3D, the disk 10 is divided into ten measurement areas indicated by zones 1 to 10 sequentially arranged from its outer circumference to its inner circumference. In the following description, zones 1 to 3 will be referred to as an outer peripheral portion, zones 4 to 7 will be referred to as a radially intermediate portion, and zones 8 to 10 will be referred to as an inner peripheral portion. In FIGS. 3A to 3D, the horizontal axis represents the ten measurement areas. Alternatively, the disk may be divided into more than ten or less than 10 measurement areas. Yet alternatively, sequential zone numbers may be assigned to the areas from the inner periphery to the outer periphery. Also alternatively, the zones are radially arranged at regular intervals or at irregular intervals.

Figure 3A:
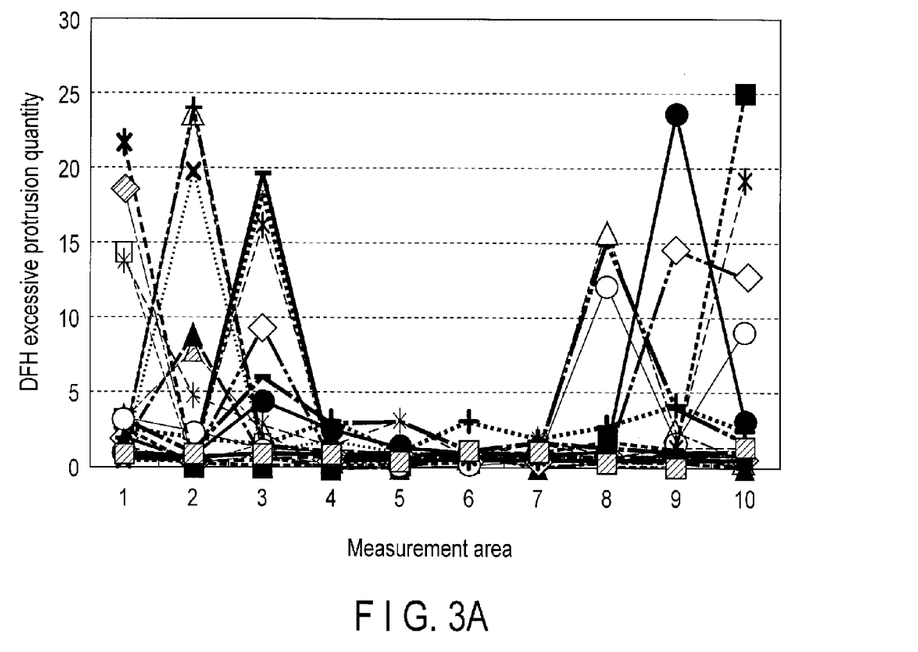
FIG. 3A is a graph showing an over-protrusion distribution example in respective measurement areas obtained when touchdown measurement is executed.
Figure 3B:
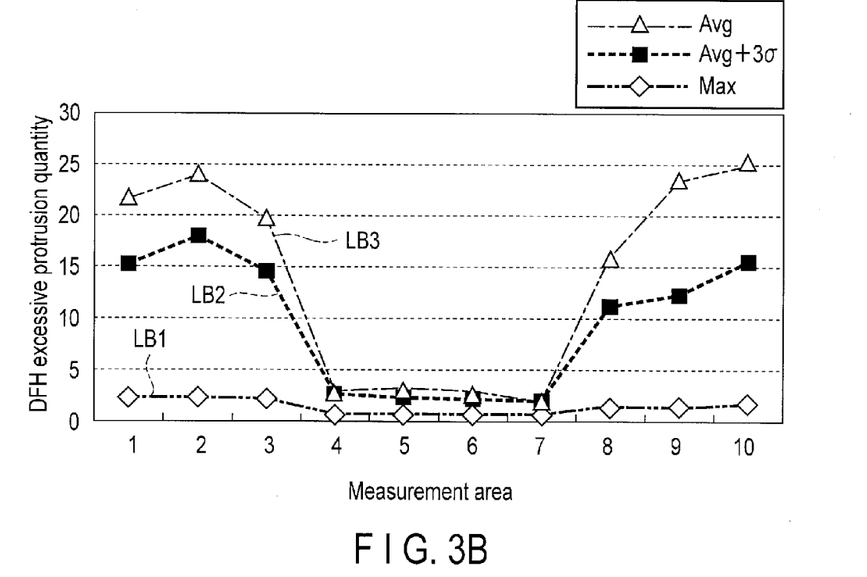
FIG. 3B is a graph showing a distribution example of maximum and average amounts of over-protrusion in the respective measurement areas of FIG. 3A.

FIG. 3A is a graph showing examples of excessive protrusion distributions in the measurement areas detected at the time of touchdown measurement, and FIG. 3B is a graph showing distributions of maximum and average excessive protrusion quantities in the measurement areas shown in FIG. 3A. In FIGS. 3A and 3B, the vertical axis represents a DAC value (excessive protrusion quantity) expressed as the difference between a pre-measured true value and a measurement value (maximum applied power). In FIG. 3B, polygonal line LB1 indicates the average values of the excessive protrusion quantities in the respective measurement areas, polygonal line LB2 indicates values obtained by adding $3\sigma$ ($\sigma$ is the standard deviation) to the respective averages, and polygonal line LB3 indicates maximum values of the excessive protrusion quantities in the respective measurement areas.

Figure 3C:
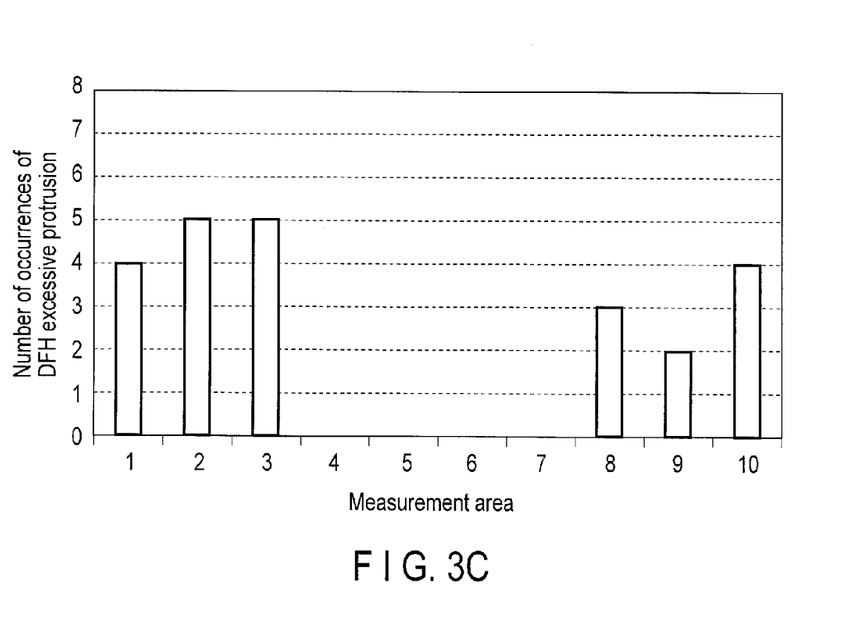
FIG. 3C is a graph showing a distribution of the numbers of occurrences of over-protrusion in the respective measurement areas of FIG. 3A.
Figure 3D:
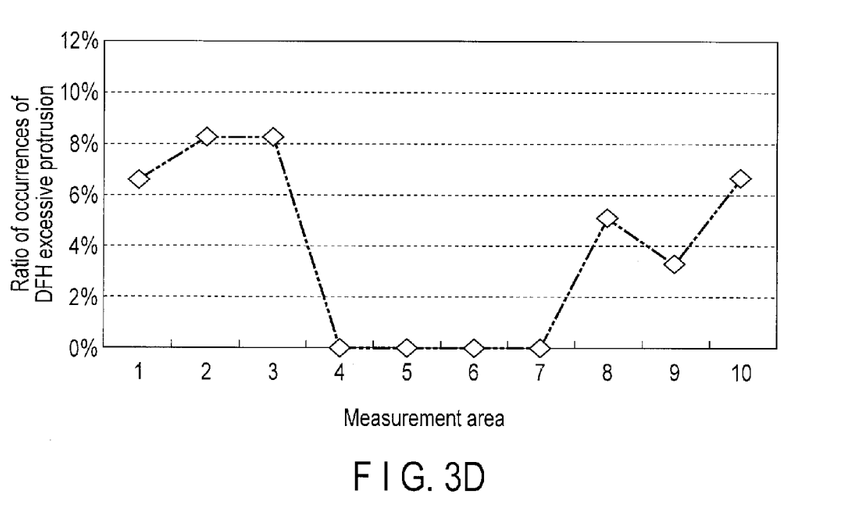
FIG. 3D is a graph showing a distribution of occurrence rates of over-protrusion in the respective measurement areas of FIG. 3A.

Moreover, FIG. 3C is a graph showing a distribution of counts of occurrences of excessive protrusion in the measurement areas shown in FIG. 3A, and FIG. 3D is a graph showing a distribution of occurrence ratios of (DFH) excessive protrusion in the measurement areas shown in FIG. 3A. In FIG. 3C, the counts of occurrences of excessive protrusion are obtained by counting the numbers of occurrences where detected excessive protrusion quantities exceed a particular excessive protrusion quantity. In FIG. 3D, the occurrence ratios of excessive protrusion each indicate the ratio of the count of occurrences of excessive protrusion in each measurement area to the count of occurrences of excessive protrusion where the detected excessive protrusion quantities exceed the particular excessive protrusion quantity.

As is evident from FIG. 3A, in this measurement experiment, the excessive protrusion quantity is greater in the outer and inner peripheral portions than in the radially intermediate portion.

Referring to the data indicating the excessive protrusion distributions shown in FIGS. 3A to 3D, the selection unit 604 determines that excessive protrusion quantities in intermediate zones 4 to 7 are smaller than those in the inner and outer peripheral portions. Namely, the selection unit 604 determines that the degrees of damage of the head 15 and the disk 10 are smaller in intermediate zones 4 to 7 during touchdown measurement than in the outer and inner peripheral portions.

An example of a method for selecting a measurement area will now be described.

Figure 4:
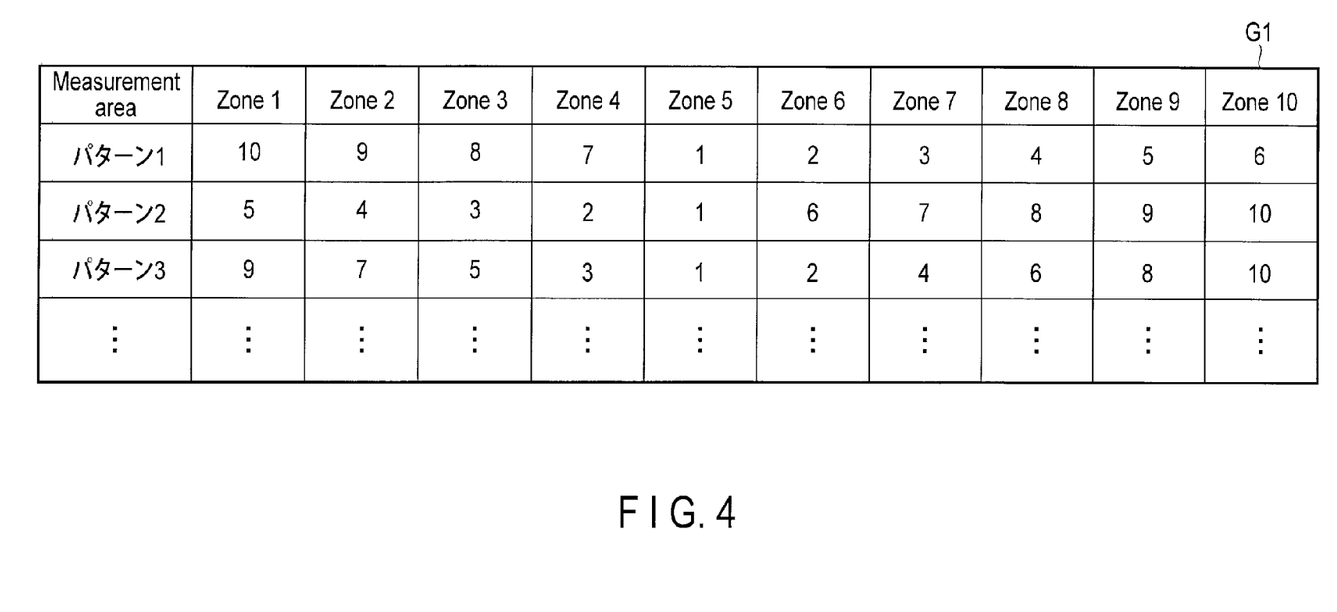
FIG. 4 is a table example showing order of measurement in the embodiment.

FIG. 4 shows an example of a table associated with a measurement order. In FIG. 4, referential code G1 denotes the whole table, zones 1 to 10 denote divided measurement areas, patterns 1 to 3 denote set patterns of order in which touchdown measurement is executed, and numbers in zones 1 to 10 of each pattern denote the order in which touchdown measurement is executed. The measurement orders shown in FIG. 4 have been set based on the results of FIGS. 3A to 3D.

Referring now to pattern 1 of table G1 shown in FIG. 4, a description will be given of an example of a method for selecting a measurement area. Hereafter, an example of the selection method of measurement area is explained with reference to pattern 1 of table G1 of FIG. 4.

With reference to the data shown in FIGS. 3A to 3D, the selection unit 604 selects a measurement area (first measurement area), where touchdown measurement is to be executed, from radially intermediate zones 4 to 7 where excessive protrusion quantities are determined to be smaller than in the other measurement areas. For example, the selection unit 604 selects zone 5 as the first measurement area.

Subsequently, the selection unit 604 selects zone 6 as a measurement area (second measurement area), where touchdown measurement is to be subsequently executed, from both measurement areas adjacent to the first measurement area (zone 5).

Subsequently, the selection unit 604 selects zone 7 as a measurement area (third measurement area), where touchdown measurement is to be subsequently executed, from non-selected both measurement areas adjacent to the already-selected measurement areas (i.e., a composite area including zones 5 and 6).

By repeating this selection processing, the selection unit 604 selects all measurement areas to extend the range of the already-selected measurement areas. Thus, the selection unit 604 sets a measurement order.

The selection unit 604 can also set the measurement order by a selection method of any other pattern included in table G1 of FIG. 4.

Referring then to pattern 2 of table G1 shown in FIG. 4, another method example of selecting a measurement area will be described.

For example, the selection unit 604 selects, as described above, the first measurement area from radially intermediate zones 4 to 7 where excessive protrusion quantities are determined to be smaller than in the other measurement areas. For example, in pattern 2, the selection unit 604 selects zone 5 as the first measurement area.

Subsequently, the selection unit 604 selects zone 4 as a measurement area (second measurement area), where touchdown measurement is to be subsequently executed, from both measurement areas adjacent to the first measurement area (zone 5).

Subsequently, the selection unit 604 selects zone 3 as a measurement area (third measurement area), where touchdown measurement is to be subsequently executed, from non-selected both measurement areas adjacent to the already-selected measurement areas (i.e., a composite area including zones 4 and 5). Thus, the selection unit 604 extends the range of the already-selected measurement areas from zone 5 to zone 1, and subsequently extends the range of the already-selected measurement areas from zone 6 to zone 10. By this selection processing, the selection unit 604 selects all measurement areas to thereby set a measurement order.

Referring then to pattern 3 of table G1 shown in FIG. 4, another method example of selecting a measurement area will be described.

For instance, the selection unit 604 selects zone 5 as a first measurement area in accordance with pattern 2 shown in FIG. 4.

Subsequently, the selection unit 604 selects zone 6 as a measurement area (second measurement area), where touchdown measurement is to be subsequently executed, from both measurement areas adjacent to the first measurement area (zone 5).

Subsequently, the selection unit 604 selects zone 4 as a measurement area (third measurement area), where touchdown measurement is to be subsequently executed, from non-selected both measurement areas adjacent to the already-selected measurement areas (i.e., a composite area including zones 5 and 6). Thus, the selection unit 604 extends the range of the already-selected measurement areas toward the opposite sides, with zone 5 set as the center. By this selection processing, the selection unit 604 selects all measurement areas to thereby set a measurement order.

Although in the above measurement order, zone 5 is selected as the first measurement area, the selection unit 604 can select another measurement area as the first measurement area, referring to the data shown in FIGS. 3A to 3D. It is sufficient if a measurement area where the excessive protrusion quantity is smaller than in the other measurement areas is set as the first measuring area. For example, referring to FIGS. 3A to 3D, the selection unit 604 may also select, as the first measurement area from radially intermediate zones 4 to 6, a measurement area where variation in excessive protrusion quantities is small, or the average of excessive protrusion quantities is low. For instance, the selection unit 604 may select zone 6 as the first measurement area, with reference to FIGS. 3A to 3D. The selection unit 604 selects all measurement areas to extend the range of the already-selected measurement areas. Thus, the selection unit 604 sets a measurement order.

Referring to the set measurement order, the setting unit 606 sequentially sets, for respective measurement areas, estimated values for the true values of measured values (touchdown measurement values) in measurement areas to be subsequently measured, excessive protrusion limit values (hereinafter, referred to simply as limit values) corresponding to the estimated values. The limit values are thresholds associated with the excessive protrusion quantity. For instance, if an excessive protrusion quantity exceeds a threshold, the head 15 and the disk 10 may be damaged, or an appropriate measured value may not be acquired.

The setting unit 606 outputs, to the measurement unit 602, data indicating an estimated value and a limit value for a set measurement area. Referring to the data, the measurement unit 602 controls the head amplifier IC 30 during execution of touchdown measurement so that the excessive protrusion quantity will not exceed the limit value.

In the description below, a limit value greater than an estimated value will be referred to as a maximum limit value, and a limit value lower than the estimated value will be referred to as a minimum limit value.

If it detects that the excessive protrusion quantity has reached the limit value, the measurement unit 602 may interrupt the output of a DFH control signal so that the excessive protrusion quantity is kept to be no more than the maximum limit value. At this time, the measurement unit 602 controls the head amplifier IC 30 so that the excessive protrusion quantity will not exceed the maximum limit value, thereby re-executing touchdown measurement on a measurement area where the touchdown measurement is interrupted. If it detects that the excessive protrusion quantity is lower than the minimum limit value, the measurement unit 602 determines that accuracy of touchdown measurement is low.

Figure 5:
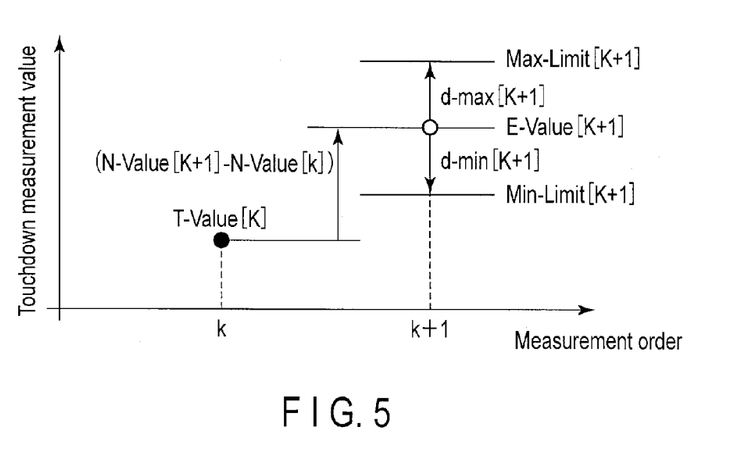
FIG. 5 is a view showing outline of a method of setting limit values in the embodiment.

FIG. 5 shows the outline of a method of setting the limit value. In FIG. 5, the vertical axis represents the touchdown measurement value, and the horizontal axis represents the measurement order.

In FIG. 5, k is the $k^{th}$ measurement order of a current measurement area where touchdown measurement has been executed (hereinafter, referred to as the current measurement area), and T-value [k] is a measured value in the current ($k^{th}$) measurement area where the touchdown measurement has been executed. E-Value [k+1] is a touchdown estimated value in a subsequent ($k+1^{th}$) measurement area (hereinafter, referred to as the subsequent measurement area) where touchdown measurement is to be subsequently performed. Each of N-Value [k] and N-Value [k+1] is the average of measured values acquired by the touchdown measurement in advance by trials in each measurement area. More specifically, N-Value [k] is an average in the current ($k^{th}$)) measurement area, and N-Value [k+1] is an average in the subsequent ($k+1^{th}$) measurement area. N-Value [k] and N-Value [k+1] are acquired with reference to average distributions (average measured-value distributions [average flying profiles]) of measured values acquired by the touchdown measurement in advance in the respective measurement areas. Max-Limit [k+1] is a maximum limit value in the subsequent measurement area, and Min-Limit [k+1] is a minimum limit value in the subsequent measurement area. d-max [k+1] is a variation for the maximum limit value in the subsequent measurement area, and d-min [k+1] is a variation for the minimum limit value in the subsequent measurement area.

Further, d-max [k+1] and d-min [k+1] are calculated based on respective variations in the difference between each of touchdown measurement values measured by the touchdown measurement in advance for the subsequent measurement area, and the estimated value (E-Value [k+1]). For instance, d-max [k+1] is a positive difference between the estimated value (E-Value [k+1]) and each of touchdown measurement values measured by the touchdown measurement in advance in each (subsequent) measurement area. Similarly, d-min [k+1] is a negative difference between the estimated value (E-Value [k+1]) and each of touchdown measurement values measured by the touchdown measurement in advance in each (subsequent) measurement area.

The setting unit 606 computes the limit values for each measurement area from the following equations:

$$E\text{-Value}[k+1] = T\text{-Value}[k] + (N\text{-Value}[k+1] - N\text{-Value}[k]) \quad (1)$$

$$\text{Max-Limit}[k+1] = E\text{-Value}[k+1] + d\text{-max}[k+1] \quad (2)$$

$$\text{Min-Limit}[k+1] = E\text{-Value}[k+1] - d\text{-min}[k+1] \quad (3)$$

The setting unit 606 outputs, to the measurement unit 602, data indicating the touchdown estimated value and the maximum and minimum values calculated by the above equations.

Referring to the measurement order of pattern 1 in table G1 of FIG. 4, an example of a procedure of setting the limit values will be described.

In touchdown measurement in the first measurement area (k=1) (zone 5), the setting unit 606 sets initial values to the maximum and minimum limit values, since the maximum and minimum limit values cannot be calculated by the above-mentioned equations (1) to (3). As the initial values, the maximum limit value is set sufficiently high, and the minimum limit value is set sufficiently low. The initial values may be preset or may be arbitrarily set.

The setting unit 606 calculates the estimated value and the maximum and minimum limit values as follows, using the above-mentioned equations (1) to (3), in touchdown measurement in the second measurement area (k+1=2) (zone 6).

$$E\text{-value}[2] = T\text{-Value}[1] + (N\text{-Value}[2] - N\text{-Value}[1]) \quad (4)$$

$$\text{Max-Limit}[2] = E\text{-Value}[2] + d\text{-max}[2] \quad (5)$$

$$\text{Min-Limit}[2] = E\text{-Value}[2] - d\text{-min}[2] \quad (6)$$

The setting unit 606 calculates touchdown estimated values and maximum and minimum values in zones 1 to 10, in accordance with the measurement order of pattern 1, as in the second measurement area.

As described above, the setting unit 606 sequentially sets limit values for respective measurement areas in accordance with the set measurement order.

Figure 6:
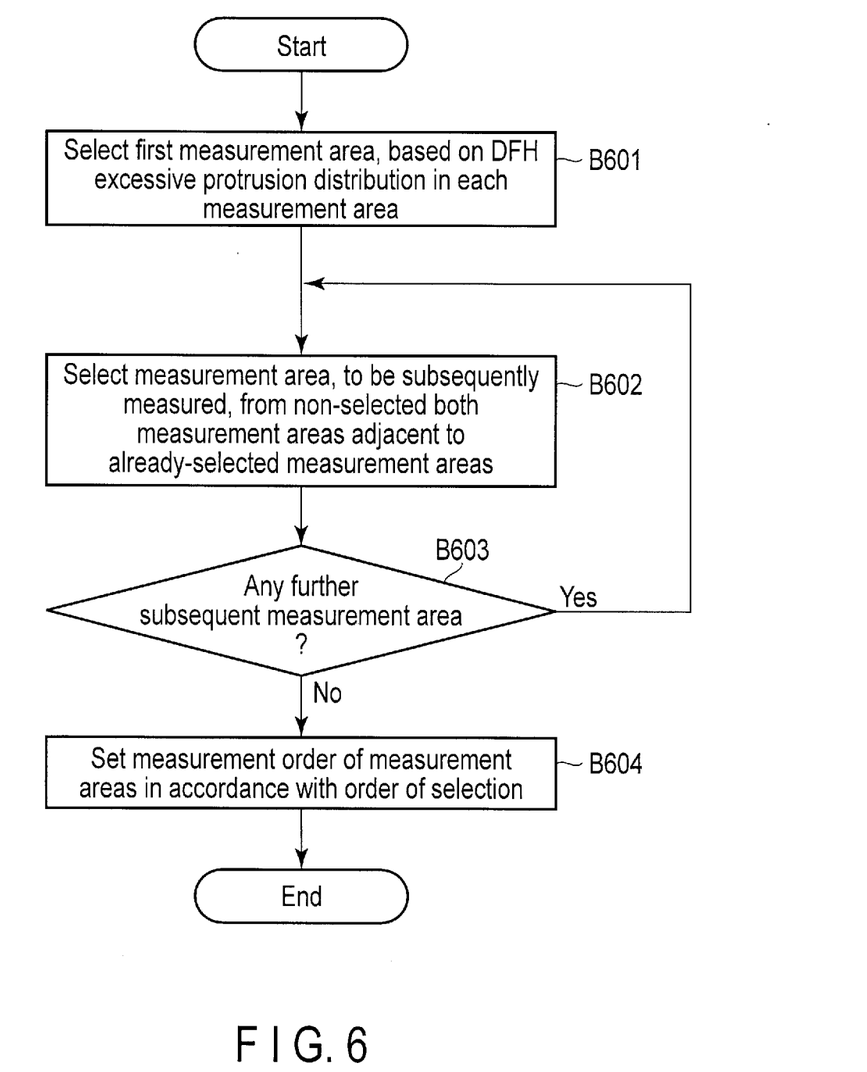
FIG. 6 is a flowchart for explaining selection of the order of measurement areas in the embodiment.

FIG. 6 is a flowchart for explaining selection of the order of measurement of the measurement areas, according to the first embodiment.

In B601, the MPU 60 selects, as the first measurement area, a measurement area where the excessive protrusion quantity is small, based on a distribution of pre-measured excessive protrusion quantities in each measurement area. In B602, the MPU 60 selects a subsequent measurement area from non-selected both measurement areas adjacent to the already-selected measurement area.

In B603, the MPU 60 determines whether there is a further subsequent measurement area. If having determined that there is a further subsequent measurement area (YES in B603), the MPU 60 returns to B602.

In contrast, if, having determined that there is no further measurement area (NO in B603), the MPU 60 sets, in B604, a measurement order for the measurement areas corresponding to the order of selection, thereby terminating the processing.

Figure 7:
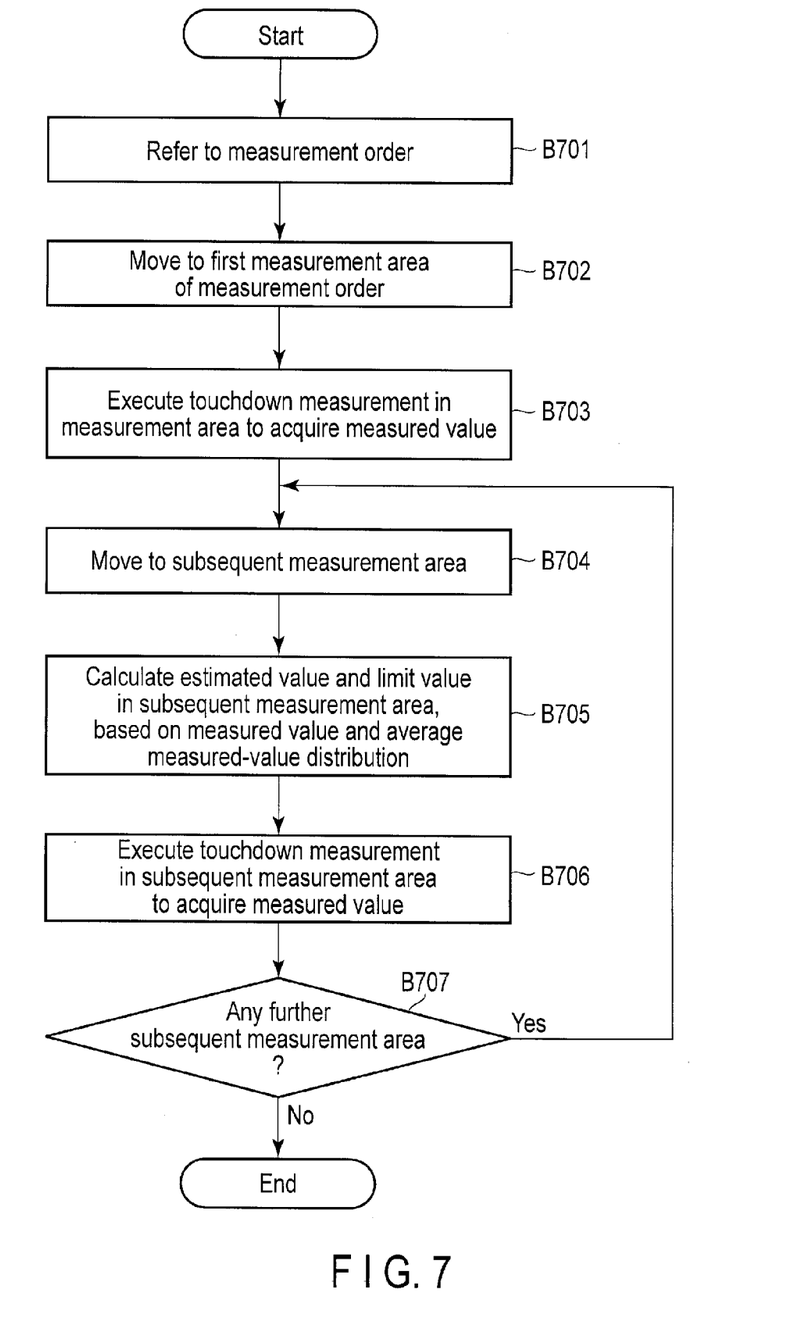
FIG. 7 is a flowchart for explaining a method of setting limit values in the embodiment.

FIG. 7 is a flowchart for setting the limit values according to the embodiment.

In B701, the MPU 60 refers to the selected measurement order. In B702, the MPU 60 moves the head 15 to the first measurement area. In B703, the MPU 60 executes touchdown measurement in the first measurement area to acquire a measured value.

In B704, the MPU 60 moves the head 15 to a subsequent measurement area. In B705, the MPU 60 calculates an estimated value and limit values for the subsequent measurement area, based on measured values in the current measurement area, and the pre-measured averages (average measured value distribution) of the current and subsequent measurement areas.

In B706, the MPU 60 executes touchdown measurement in the subsequent measurement area with reference to the calculated estimated value and limit values, thereby acquiring a measured value.

In B707, the MPU 60 determines whether a further subsequent measurement area exists. If a further subsequent measurement area exists (YES in B707), the MPU 60 returns to B704.

In contrast, if no further measurement area exists (NO in B705), the processing is finished.

According to the embodiment, a control signal of an excessive power is prevented from being applied to the heater during touchdown measurement, by calculating maximum and minimum limit values for a measurement area to be measured subsequently. As a result, excessive damage on the head and the disk due to excessive touchdown can be avoided. Further, by executing touchdown measurement, beginning with a measurement area where its excessive protrusion quantity is small, variation in the measured value can be reduced. This can prevent an abnormal head flying height during read/write of the magnetic disk device, thereby enhancing the read/write performance and the reliability of the magnetic disk device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A measurement method for use in a disk device comprising a disk, and a head configured to protrude toward the disk when power is supplied to a heater, the method comprising:
   acquiring a reference value for each of a plurality of areas into which the disk is divided, from a measurement-value distribution including a plurality of measured values measured by a measurement in advance, the measurement including measuring a value corresponding to power supplied to the heater when the head contact with the disk;
   acquiring, in each of the plurality of areas, a groups of data calculated based on the measurement-value distribution and the acquired reference value;
   referring to the groups of data corresponding to each of the plurality of areas, and selecting, from the plurality of areas as a first area to be firstly subjected to the measurement, an area where the groups of data has lower values than in other areas; and
   selecting an area to be subjected to the measurement subsequent to the first area based on the groups of data in each areas.

2. The method of claim 1, further comprising selecting, as a second area, one of areas adjacent to the first area.

3. The method of claim 2, further comprising:
   selecting, as a third area, one of two non-selected areas adjacent to a first composite area that includes the already-selected first and second areas;
   selecting, as a fourth area, one of two non-selected areas adjacent to a second composite area that includes the already-selected first, second and third areas;
   executing, on all of the plurality of areas, processing of selecting one of two non-selected areas adjacent to a composite area including already-selected areas; and
   setting, for the plurality of areas, an order of the measurement executed in an order of selection.

4. The method of claim 1, further comprising:
   acquiring a first measured value in the first area in an order set for executing the measurement in the plurality of areas in an order of selection; and
   calculating a first estimated value for a second measured value in a second area to be subsequently subjected to the measurement, based on the first measured value and the measured-value distribution.

5. The method of claim 4, further comprising:
   calculating a first limit value being a sum of a first difference value as a difference between the first estimated value and each of the measured values in the measurement-value distribution, and the first estimated value; and
   acquiring the second measured value in the second area, referring to the first limit value.

6. The method of claim 5, further comprising:
   calculating a second estimated value for a third measured value in a third area to be subjected to the measurement subsequent to the second area, based on the second measured value and the measurement-value distribution;
   calculating a second limit value, the second limit value being a sum of a second difference value as a difference between the second estimated value and each of the measured values in the measurement-value distribution, and the second estimated value; and
   acquiring the third measured value in the third area, referring to the second limit value.

7. The method of claim 1, further comprising:
   calculating an estimated value in an area to be subsequently subjected to the measurement, in accordance with an order set to execute the measurement in the plurality of areas in an order of selection, based on a measured value and the measured-value distribution;
   calculating a limit value being a sum of a difference between the estimated value and each of the measured values in the measurement-value distribution, and the estimated value; and
   executing, on all of the plurality of areas, processing of acquiring a measured value in an area to be subsequently subjected to the measurement, referring to the limit value.

8. The method of claim 7, further comprising: when the measured value in the area to be subsequently subjected to the measurement reaches a maximum value of the limit value, interrupting supply of power to the heater.

9. The method of claim 8, further comprising: when the measured value in the area to be subsequently subjected to the measurement reaches the maximum value of the limit value, interrupting the measurement in the area, and resuming the measurement after the interrupting the measurement.

10. A method of manufacturing a magnetic disk device comprising a disk, a head configured to protrude toward the disk when power is supplied to a heater, a memory, and a controller configured to control a flying height of the head during read and write, referring to data stored in the memory, the method comprising:
    acquiring a reference value for each of a plurality of areas into which the disk is divided, from a measurement-value distribution including a plurality of measured values measured by a measurement in advance, the measurement including measuring a value corresponding to power supplied to the heater when the head contact with the disk;
    acquiring, in each of the plurality of areas, a groups of data calculated based on the measurement-value distribution and the acquired reference value;
    referring to the groups of data corresponding to each of the plurality of areas, and selecting, from the plurality of areas as a first area to be firstly subjected to the measurement, an area where the groups of data has lower values than in other areas; and
    storing the acquired reference value and data regarding to the first area in the memory.

11. The method of claim 10, further comprising:
selecting, as a second area, one of areas adjacent to the first area; and
storing data regarding to the second area in the memory.

12. The method of claim 11, further comprising:
selecting, as a third area, one of two non-selected areas adjacent to a first composite area that includes the already-selected first and second areas;
selecting, as a fourth area, one of two non-selected areas adjacent to a second composite area that includes the already-selected first, second and third areas;
executing, on all of the plurality of areas, processing of selecting one of two non-selected areas adjacent to a composite area including already-selected areas;
setting, for the plurality of areas, an order of the measurement executed in an order of selection; and
storing data regarding to the order in the memory.

13. The method of claim 10, further comprising:
acquiring a first measured value in the first area in an order set for executing the measurement in the plurality of areas in an order of selection; and
calculating a first estimated value for a second measured value in a second area to be subsequently subjected to the measurement, based on the first measured value and the measured-value distribution.

14. The method of claim 13, further comprising:
calculating a first limit value being a sum of a first difference value as a difference between the first estimated value and each of the measured values in the measurement-value distribution, and the first estimated value; and
acquiring the second measured value in the second area, referring to the first limit value.

15. The method of claim 14, further comprising:
calculating a second estimated value for a third measured value in a third area to be subjected to the measurement subsequent to the second area, based on the second measured value and the measurement-value distribution;
calculating a second limit value, the second limit value being a sum of a second difference value as a difference between the second estimated value and each of the measured values in the measurement-value distribution, and the second estimated value; and
acquiring the third measured value in the third area, referring to the second limit value.

16. The method of claim 10, further comprising:
calculating an estimated value in an area to be subsequently subjected to the measurement, in accordance with an order set to execute the measurement in the plurality of areas in an order of selection, based on a measured value and the measured-value distribution;
calculating a limit value being a sum of a difference between the estimated value and each of the measured values in the measurement-value distribution, and the estimated value; and
executing, on all of the plurality of areas, processing of acquiring a measured value in an area to be subsequently subjected to the measurement, referring to the limit value.

17. The method of claim 16, further comprising: when the second measured value reaches a first maximum value of the first limit value, interrupting supply of power to the heater.

18. The method of claim 17, further comprising: when the measured value in the area to be subsequently subjected to the measurement reaches the maximum value of the limit value, interrupting the measurement in the area, and resuming the measurement after the interrupting the measurement.

19. A magnetic disk device comprising:
a disk;
a head configured to protrude toward the disk when power is supplied to a heater; and
a controller configured to:
acquire a reference value for each of a plurality of areas into which the disk is divided, from a measurement-value distribution including a plurality of measured values measured in advance, the measurement including measuring a value corresponding to power supplied to the heater when the head contact with the disk;
acquire a groups of data calculated based on the measurement-value distribution and the acquired reference value;
refer to the groups of data to select, from the plurality of areas as a first area to be firstly subjected to the measurement, an area where the groups of data has lower values than in other areas;
execute, on all of the plurality of areas, processing of selecting one of two non-selected areas adjacent to a composite area including the already-selected area; and
set, for the plurality of areas, an order of the measurement executed in an order of selection.

20. The magnetic disk device of claim 19, wherein the controller is further configured to:
acquire a first measured value in the first area in accordance with the order;
calculate an estimated value for a second measured value in a second area to be subsequently subjected to the measurement, based on the first measured value and the measured-value distribution;
calculate a limit value that is a sum of a difference between the estimated value and each of the measured values in the measurement-value distribution, and the estimated value; and
acquire the second measured value in the second area, referring to the limit value.

* * * * *